United States Patent [19]
Simons et al.

[11] 4,105,245
[45] Aug. 8, 1978

[54] FORWARD, STOWABLE SEAT AND BACK

[75] Inventors: Wayne K. Simons, Federal Way; Donald J. Teodoro, Seattle, both of Wash.

[73] Assignee: Paccar Inc., Bellevue, Wash.

[21] Appl. No.: 735,091

[22] Filed: Oct. 22, 1976

[51] Int. Cl.² ............................................. B60N 1/02
[52] U.S. Cl. ................................... 280/65 R; 297/379
[58] Field of Search ................... 296/65 R; 248/188.6, 248/376, 421, 280, 281; 108/145; 297/378, 379, 16

[56] References Cited

U.S. PATENT DOCUMENTS

| | | | |
|---|---|---|---|
| 171,746 | 1/1876 | Starr | 248/281 |
| 177,526 | 5/1876 | Lawrence | 297/378 |
| 1,427,280 | 8/1922 | Gahm | 297/378 |
| 3,419,307 | 12/1968 | Strobush | 297/379 |

FOREIGN PATENT DOCUMENTS 1,580,600  12/1970  Fed. Rep. of Germany ........ 296/65 R

*Primary Examiner*—Joseph F. Peters, Jr.
*Assistant Examiner*—R. Schrecengost
*Attorney, Agent, or Firm*—Seed, Berry, Vernon & Baynham

[57] ABSTRACT

A forward, stowable seat and back has a seat frame, floor frame, and forward and rear sets of upright frames which form a modified parallelogram to allow swingable movement of the seat and back from a cantilevered rear position in which the seat and back are cantilevered or suspended rearwardly of the floor frame and a stowable, forward position in which the seat and back are moved forwardly of the rear end of the floor frame. A collapsible link limits the rearward movement of the seat and back and is releasibly held in position by a hook member which latches onto a latch pin hingedly connecting upper and lower links of a brace. The back is held in its rearward position by an elongated strap that slides in a track on the back. Independent, pivotal movement of the back relative to the seat frame occurs by pressing a button on the rear of the back and pivoting the back forward allowing the upper end of the strap to slide along and be guided in the track.

5 Claims, 4 Drawing Figures

FORWARD, STOWABLE SEAT AND BACK

BACKGROUND OF THE INVENTION

FIELD OF THE INVENTION

This invention pertains to seats for the driving compartment of automotive trucks, especially the tractor of a tractor-trailer truck in which the tractor is provided with a driving compartment and a sleeper compartment.

SUMMARY OF THE INVENTION

In automotive truck cabs of the type having a driver compartment and a rearward, sleeper compartment it is desirable to maximize the floor space available to the occupant of the sleeper. This floor space is often occupied by the passenger seat in the driver's compartment such that it is difficult to gain access to the sleeper compartment.

It is an object of this invention to provide a stowable seat and back which provides easy entrance to the sleeper compartment and optimizes available floor space in the sleeper compartment for standing room.

It is another object of this invention to provide a stowable seat and back which is safe and simple to operate.

These objects are obtained by providing a forward, stowable seat and back having a floor frame, a seat frame and fore and aft upright frames which are pivotally connected to allow the seat and back to swing from a rearward position in which the seat and back are suspended rearwardly of the floor frame into a forward stowage position in which the seat and back are forward at least of the rear end portion of the floor frame thus exposing floor space for the use of the sleeper compartment occupant. The frames are preferably precluded from further rearward movement by brace means which are collapsible as the seat is moved forward. Releasible latch means locks the seat frame against further movement preferably by latching the brace means against movement. The back is movable with the stowable seat and back and is also independently pivotable. An integral strap is secured at its lower end to the seat frame and its upper end is freely slidable within a track vertically mounted on the back. A detent released by a button on the back which is accessible by reaching around from the front of the seat unhooks the strap so that the seat can be pivoted forward.

DETAILED DESCRIPTION OF THE PREFERRED EMBODIMENTS

A seat 10 is mounted on a seat frame 12. A back support 14 is bolted to the seat frame and pivotally mounts a back 16. The seat and back are provided with standard cushion material illustrated in phantom lines.

Figure 2:
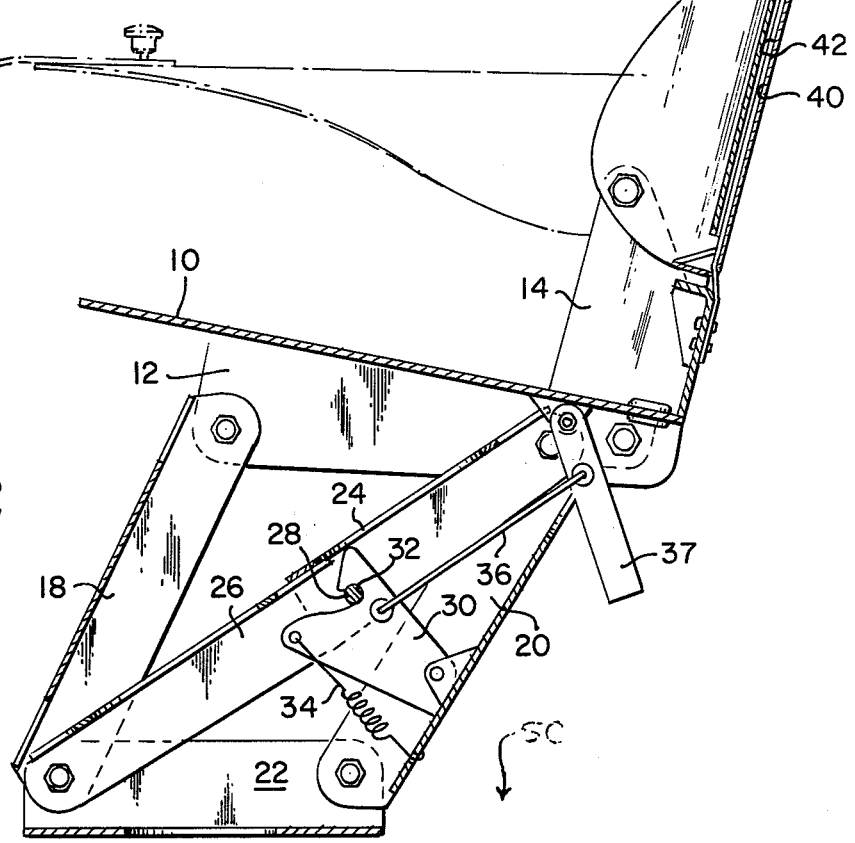
FIG. 2 is a vertical section of the seat and back shown in FIG. 1

The seat frame 12 is supported by forward and rearward upright frames 18 and 20, respectively, which are pivotally mounted at their upper ends to the seat frame and pivotally mounted at their lower ends to form a modified parallelogram with a floor frame 22. The floor frame is welded or otherwise suitable bolted to the floor of the driver's compartment of the automotive truck. As best shown in FIG. 2, while the floor frame 22 is in the driver's compartment, the space immediately behind the floor frame, indicated by the designation SC, is part of the sleeper compartment.

Figure 1:
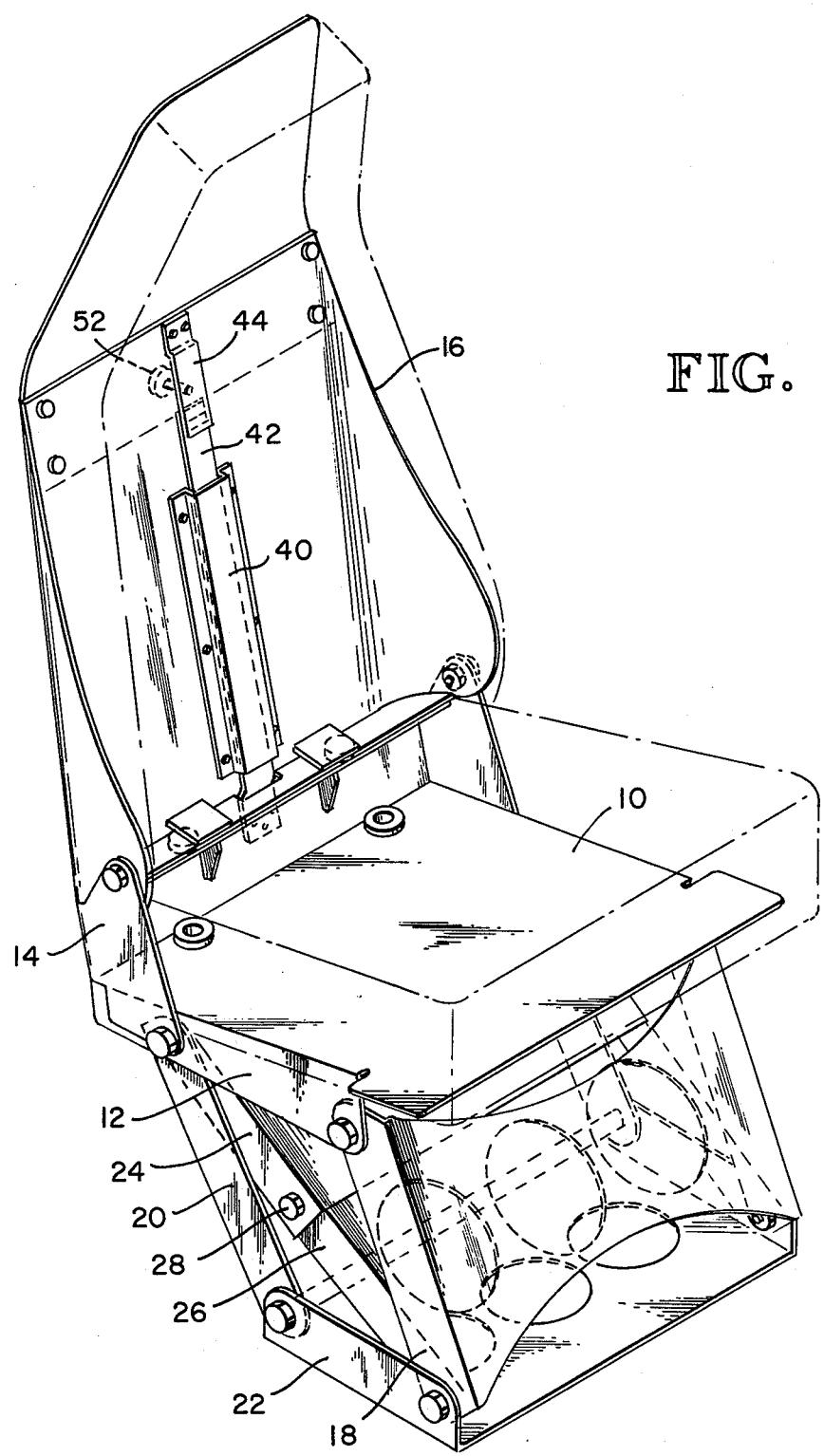
FIG. 1 is an isometric of the forward, stowable seat and back looking from the passenger door of an automotive truck driver's compartment.
Figure 3:
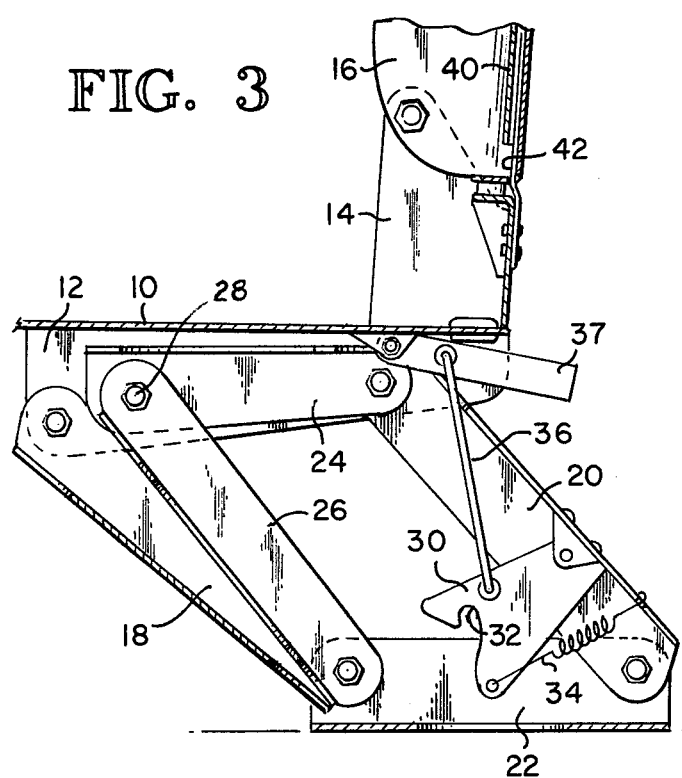
FIG. 3 is a fragmentary side elevation of the seat and back showing the seat in a forward, stowed position.
Figure 4:
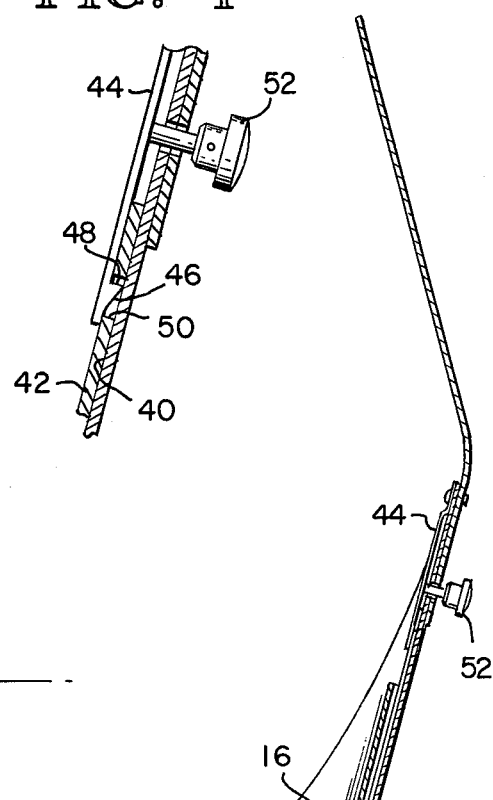
FIG. 4 is a fragmentary vertical section through a portion of the back.

As best shown in FIG. 2, the modified parallelogram links 18 and 20 are suspended rearwardly with the seat and back overlying the sleeper compartment space a substantial distance behind the floor frame 22. The seat frame is held in position by opposed braces each formed of an upper link 24 and a lower link 26 which are pivotally mounted, respectively, to the seat frame 12 and the floor frame 22. The links overlap and are pivotally joined by a latch pin 28. As is readily apparent when the links are extended in the position shown in FIG. 2, no further rearward movement is possible of the seat and back. As shown in FIG. 3, however, the links can pivot at the latch pin allowing the seat and back to move into the forward position exposing the floor space of the sleeper compartment. The overlap between the upper and lower links provides a positive stop against inadvertent forward movement of the seat and back so long as the latch pin 28 is held against forward movement. For this purpose, a latching mechanism is provided.

The latching mechanism includes a hook member 30 having a hook catch or opening 32. The hook member is pivotally mounted to the rearward, upright frame 20 and a spring 34 pivots the hook member into the latching position. A flexible link 36 is coupled to a pivotal handle 37 such that by pulling up on the handle 37 the hook member will swing upwardly, releasing the latch pin 28.

The back 16 is independently pivotally mounted to the back supports 14. The back is provided with an elongated, vertical slide track 40 which slidably receives an upper end of a flexible, steel strap 42. The strap lower end is secured by riveting or otherwise to the back supports 14. The upper end of the track 42 is provided withe a spring bar 44 having a catch with a cam opening surface 46 and a stop surface 48. The upper end of the strap is provided with an opening 50. The spring bar can be moved away from the back by a button 52. As is readily apparent as the back is swung rearwardly, the upper end of the strap will engage the cam opening surface 46 moving the spring bar to the left. As the opening in the strap passes the stop surface 48, that is, when the back is in its rearward position, the back can no longer be inadvertently pivoted forward.

While the preferred embodiments of the invention have been illustrated and described, it should be understood that variations will be apparent to one skilled in the art without departing from the principles herein. Accordingly, the invention is not to be limited to the specific form illustrated in the drawing.

The embodiments of the invention in which a particular property or privilege is claimed are defined as follows:

1. A forward, stowable seat and back for the driving compartment of an automotive truck cab of the type having a forward driving compartment and a rearward sleeper compartment, including a seat, a back and a base supporting the seat and back in the driving compartment, the improvement comprising:

said base including a seat frame, a floor frame, forward and rearward upright frames pivotally mounted between the seat and floor frames for pivotal fore and aft movement of the seat and back, brace means for supporting the upright frames in their aft position with the seat and back suspended substantially rearwardly of the floor frame, and releasible latch means for holding the upright frames in the rearward position against forward or rearward movement, said upright frames when unlatched being swingable into said forward position with said seat and back being moved substantially forward of the rearward end of said floor frame whereby an occupant can stand in the compartment in the place formerly occupied by the seat and back when in the aft position, said brace means including a set of upper and lower links pivotally mounted together at overlapping ends, the lower link being pivotally mounted to a forward end of the floor frame, the upper link being pivotally mounted at a rearward end of the seat frame whereby rearward movement of the upright frames is precluded beyond said rearward position by the links but forward movement is allowed by pivoting of the links forwardly.

2. The seat of claim 1, said pivotal mounting between said upper and lower links including a latch pin, said latch means including a hook member pivoted to the rearward upright frame and having a hook catch spring biased over the latch pin to hold the latch pin against forward movement, and handle means for swinging said hook member to free said latch pin.

3. The seat of claim 1, said back being pivotally mounted to said seat frame and including a locking strap secured at its lower end to said seat frame, a slide track extending vertically along said back, said locking strap having an upper end slidably received in said track and slidable therealong when the back is pivoted forward, and detent means for releasably locking said strap against movement in said track for precluding pivotal movement of the back.

4. A forward, stowable seat and back having a seat frame and a pivotally mounted back for an automotive truck driver's compartment, the improvement comprising:
 a single flexible locking strap rigidly secured at its lower end to said seat frame,
 a slide track extending vertically along said back,
 said flexible locking strap having an upper end slidably received in said track and slidable therealong when the back is pivoted forward, said lower end resiliently bending when said back is pivoted, and
 detent means for releasibly locking said strap against movement in said track for precluding pivotal movement of the back.

5. The seat of claim 4, said detent means including a spring bar having within the track a cam opening surface and a stop surface, a knob for pressing the spring bar away from the back to move the stop surface out of the track to release the strap and when released allowing the cam opening and stop surfaces to move into the track, whereby upward movement of the strap will open the spring bar until the stop surface is engaged to hold the strap.

* * * * *